Feb. 10, 1970 A. MAREK 3,495,174
APPARATUS FOR EVALUATING THE TRANSIENT BEHAVIOR
OF A REPETITIVELY SWITCHED TEST DEVICE
Filed April 28, 1967 8 Sheets-Sheet 1

INVENTOR:
Alois MAREK
BY Arthur O. Klein
his Attorney

Fig. 2

INVENTOR.
Alois MAREK

INVENTOR:
Alois MAREK
BY Arthur O. Klein
his Attorney

INVENTOR:
Alois MAREK
Arthur O. Klein
his Attorney

INVENTOR:
Alois MAREK
BY Arthur O. Klein
his Attorney

United States Patent Office 3,495,174
Patented Feb. 10, 1970

3,495,174
APPARATUS FOR EVALUATING THE TRANSIENT BEHAVIOR OF A REPETITIVELY SWITCHED TEST DEVICE
Alois Marek, Prague, Czechoslovakia, assignor to Vyzkumny ustav matematickych stroju, Prague, Czechoslovakia, a corporation of Czechoslovakia
Filed Apr. 28, 1967, Ser. No. 634,627
Claims priority, application Czechoslovakia, May 3, 1966, 2,974/66
Int. Cl. G01r 31/28
U.S. Cl. 324—158    4 Claims

ABSTRACT OF THE DISCLOSURE

Apparatus is disclosed for measuring integral quantities during transient processes, for example the reverse recovery charge of semiconductor diodes where the measured charge is represented by the time integral of the recovery current. On the device under test are alternately impressed a main pair and an auxiliary pair of repetitively switched measuring conditions. The conditions in each pair are switched at a faster rate than t herate of alternation between the two pairs. The output of the test device is then processed and supplied into an output meter in such a manner that this meter indicates the integral of the output quantity of the test device during a selected integration interval proportional to the recovery time of the test device.

BACKGROUND OF THE INVENTION

The invention relates to apparatus for measuring integral quantities during transient processes.

A typical example of measuring small integral quantities during a transient process is the measurement of the reverse recovery charge during the switching of semiconductor diodes where the measured charge is represented by the integral of the recovery current with time. Another example is the measurement of the quantity of light radiated as secondary emission from a luminescent material after interruption of an exciting primary radiation. In this case the quantity of light is represented by the integral of residual light flux after such interruption. Still another example is the measurement of induced magnetic flux represented by the time integral of the voltage induced on a loop through which the measured induction flux passes during the examined transient process.

One apparatus of this type which is particularly adapted for measuring the reverse recovery charge of a repetitively switched semiconductor diode uses a gated symmetrical tube bridge which becomes opened only when the transient component of the back current passes through the measured diode. This device has the drawback that, due to instability of the gated tube bridge charge discrimination is limited to approx. $20.10^{-12}$ C ($=20$ pf.).

Another known apparatus of the type employs a sampling oscilloscope in the measuring equipment. If visual examination of the development of the recovery process with time is not required, this device is too costly.

Moreover, neither of such arrangements can distinguish between the charge of minority carriers and the charge of majority carriers from the semiconductor junction and associated lead capacitances.

SUMMARY OF THE INVENTION

It is a general object of the invention to eliminate the above mentioned drawbacks in apparatus for measuring transient integral quantities.

The measuring apparatus in accordance with the invention includes a first pulse generator operating at a first frequency; a second pulse generator operating at a second frequency lower than the first frequency; and conditioning means responsive to the outputs of the first and second pulse generators for (a) alternately impressing two sets of excitation conditions on the device under test at the relatively low second frequency and for (b) repetitively switching the conditions of the impressed set at the relatively high first frequency. The resultant output of the test device contains components at both the first and second frequencies and is applied via a sensing element to a normally closed gate which is repetitively opened at the first frequency. The gate output is integrated to pass the gate output component at the second frequency but to attenuate substantially the component at the first frequency. The integrator output is applied to a detector (preferably a synchronous detector operating at the second frequency). The detected output at the second frequency, which is proportional to the desired transient integral quantity, may be applied to a suitable indicating device for display.

The arrangement in accordance with the invention may further include a conventional time-base generator (i.e., a ramp) associated with the conditioning means in such a manner that one of the repetitively switched conditions is modulated in amplitude by the time-base generator. In such a case, a coordinate recorder may be employed as the indicating device. One coordinate of the recorder is driven by the modulated condition amplitude while the other coordinate is connected to the output of the detector.

The invention and its above and other objects and features as well as its various advantages will be best understood from the following specification to be read with the accompanying drawings which illustrate examples of carrying out the invention.

DESCRIPTION OF THE PREFERRED EMBODIMENTS

Figures 1, 3, 13:
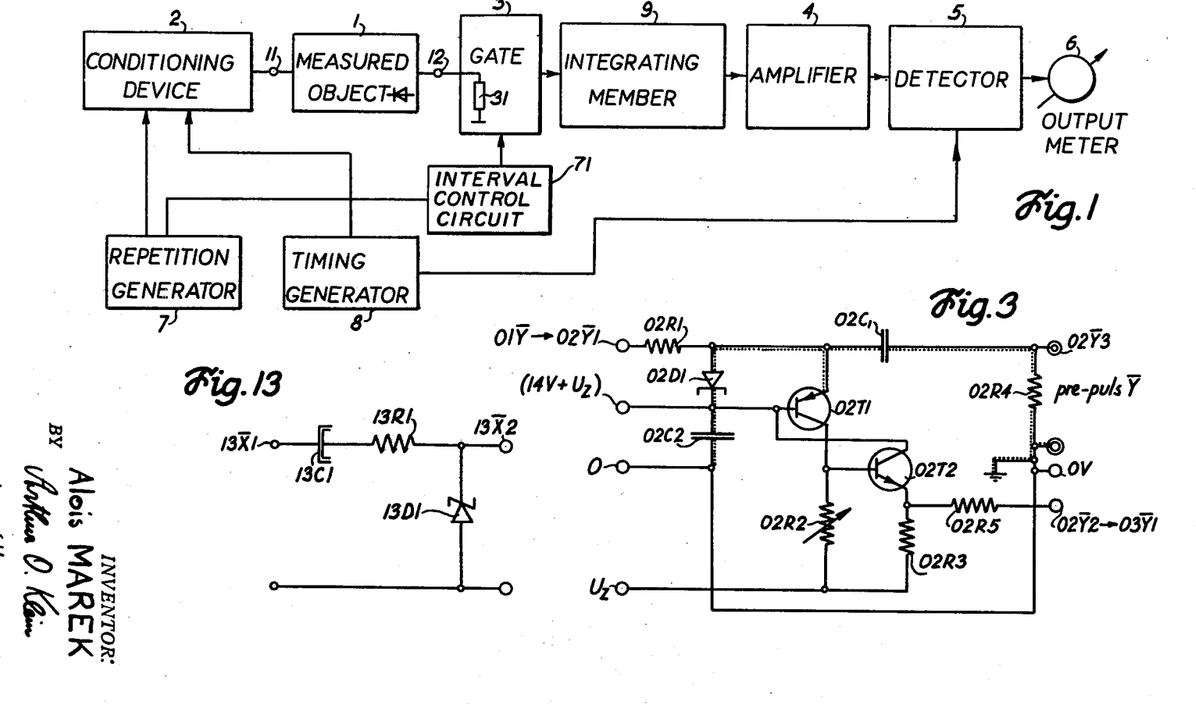
FIG. 1 is a block diagram of a preferred arrangement of the device in accordance with the invention.
FIG. 3 illustrates a delay network to be used in the invention.
FIG. 13 illustrates in more detail the arrangement of FIG. 2.

Referring now more particularly to FIG. 1 it should be understood that the device under test represented generally by block 1 can be of many types, some of which will be specially mentioned in the following illustrative embodiments of the invention.

Illustratively, block 1 represents a switching diode of the semiconductor type whose reverse recovery charge is to be measured. The diode is connected with the polarity indicated in the block.

The anode terminal 12 of the measured diode is connected in the circuit of a high-speed gate 3 through a sensing element illustratively a small resistor 31. The voltage across the resistor 31 is proportional to the instantaneous value of the current flowing through the measured diode.

A suitable conditioning circuit represented by block 2 is arranged to impress selectable pairs of the following excitation conditions on the cathode terminal 12 of the diode.

C (for current)—non-zero current in the forward direction and of a selectable magnitude;
V (for voltage)—non-zero voltage in the reverse direction and of a selectable magnitude;
$\overline{C}$—zero or no-current in the forward direction;
$\overline{V}$—zero or no-voltage in the reverse direction.

A pulse generator 7 (hereafter repetition generator) operating at a relatively high first frequency is coupled to the conditioning device 2 for repetitively switching the conditions in the selected pair at the first frequency.

The apparatus is so designed that transitions between the various states C, $\overline{C}$, V and $\overline{V}$ which are of importance in the measurement are accomplished at a very high speed. For example, when measuring the back recovery of silicon planar diodes, transition from state C to state V is accomplished within a time of the order $10^{-9}$ seconds.

Several constituents may make up the reverse recovery charge of a semiconductor diode. For example, over the duration of condition V there flows through the diode in the steady state condition only the current given by the static characteristic. This charge constituent is the integral of such steady current with time and is designated $Q_G$.

If condition $\overline{C}$ precedes condition V, the transition between them yields a charge component $Q_M$ which must be added to the charge $Q_G$. This additional charge component $Q_M$ is carried by majority carriers (either from barrier widening or from displacement current flowing, e.g. in lead capacitances).

If condition C precedes condition V, there flows in addition to $Q_G$ and $Q_M$ also a charge component $Q_m$ carried by minority carriers.

Hence, variations in the excitation conditions result in corresponding variations of the types of charge-producing current which flow through the diode both at the beginning of and over the duration of the condition V. The time interval over which the charge carried by these currents is to be measured is determined by the time during which the high-speed gate 3 is open. This gate is operated by the interval controlling circuit 71 at the rate of the repetition generator 7.

If two of the conditions C, $\overline{C}$, V, $\overline{V}$ are switched repetitively at the frequency of the repetition generator, and if the resulting output of the gate 3 is integrated over each successive interval corresponding to the reverse recovery interval of the diode, such integrated output would include components of charge which have passed through the gate during the integration interval. Ordinarily, however, such integrated output is adversely affected by drift in the gate 3, and in addition generally contains unwanted components of charge.

In accordance with the invention, this drawback can be eliminated by using the "alternation" or "modulation" method, wherein in addition to the rapid repetitive switching of conditions in the selected pair (hereafter "main pair") at the first frequency, this main pair of conditions is alternated at a much slower second frequency with another pair of conditions, to be referred to as the auxiliary pair of conditions by also driving the conditioning device 2 with a pulse generator 8 (hereafter "timing generator") operating at the second frequency. The auxiliary pair of conditions is selected so that the desired component of the charge which is to be measured is contained in the integrated output of the high-speed gate during the repetitive switching of the conditions in the main pair but not during the corresponding repetitive switching of the conditions in the auxiliary pair. Because of this and the relatively slow alternations between the two sets of conditions, the integrated output of the gate 3 contains components at both the first and second frequencies, and the component representing the desired charge component varies at the frequency of the timing generator 8. The integrated signal from the gate 3 is coupled through a low-frequency amplifier 4 into a synchronous detector 5 which is also operated at the rate of the timing generator 8. The output from the synchronous detector, which may also include a low-pass filter, is applied to a suitable measuring device 6 which indicates directly the magnitude of the desired charge component which has passed through the gate during the selected integration interval.

The integration constant of the integration member 9 is chosen to pass the output component of the gate 3 having the relatively low second frequecy but to substantially attenuate the ouput gate component having the relatively high first frequency.

The conditions C, $\overline{C}$, V, $\overline{V}$ are alternated in the following manner for measuring the charge of semiconductor diodes:

for $Q_m$ one alternates the main pair C, V with the auxiliary pair $\overline{C}$, V, for $Q_M$ one alternates the main pair $\overline{V}$, V with the auxiliary pair V, V, for $Q_G$ one alternates the main pair V, V with the auxiliary pair $\overline{V}$, $\overline{V}$, for $K_m+Q_M$ one alternates the main pair C, V with the auxiliary pair V, V.

The charge discriminating power of the measuring apparatus in accordance with the invention is very high (in the order of $10^{-14}$ C) and is ultimately limited not by drifts but by noise. The apparatus in accordance with the invention has also the advantage of permitting integration over longer intervals than that generally possible in the prior art, e.g., with apparatus employing sampling oscilloscopes. In particular, over the relatively short integration times employed in such prior art instruments, the reverse recovery characteristic of a silicon planar diode of high quality appears quite similar to the corresponding characteristic of a poorer qualtiy germanium diode having a much longer recovery time. The substantial extension of the integration interval accomplished by the invention permits the accurate determination of the quality of a measured diode since a longer integration interval reveals its entire reverse recovery characteristic.

Such long integration time also allows the measured diode to reach the steady state condition while condition C still prevails; the forward recovery characteristic as well as the reverse recovery characteristic is therefore well defined. The forward recovery process lasts usually for a few orders of magnitude longer than the reverse recovery process although it is not so pronounced.

A conventional time base or ramp generator may also be coupled to the conditioning device 2 such that one of the repetitively switched conditions C, $\overline{C}$, V, $\overline{V}$ of the then-impressed pair is amplitude-modulated by the ramp. In such a case, the indicating device 6 may be an X–Y recorder, wherein the X coordinate will be correspondingly modulated and the Y coordinate will be driven by the output of the detector 5. For example, if the main pair of conditions is defined by C, V and the auxiliary pair by $\overline{C}$, V the forward current may be adjusted under condition C by means of the time base generator so that the impressed forward current increases monotonically. Thus, if condition C is amplitude-modulated and the X axis of the recorder is controlled by the amplitude-modulated condition, and the Y axis is controlled by the detector output representative of the measured charge, illustratively $Q_m$ the curves representing the relationship $$Q_m = f(I)$$

and similarly $Q_m = f(U)$, may be directly formed on the recorder I being the impressed forward current and U the impressed reverse voltage under condition V.

In a second embodiment of the invention for measuring transient integral quantities, the quantity of light in the residual secondary emission of a selectively excited luminescent crystal (not shown) may be measured with the arrangement of FIG. 1. This quantity of light in such secondary emission is represented by the time integral of light flux. In case of monochromatic radiation the quantity would be equal to the number of photons radiated; the constant of proportionality depends on the selection of the physical units.

To accomplish the measurement in accordance with the second example, the blocks shown in FIG. 1 and numbered 7, 8, 71, 9, 4, 5, 6 may remain the same as those used for measuring the diode charge. The conditioning device represented by block 2 impresses on the luminescent test crystal the following conditions:

P—illumination of the crystal by primary monochromatic ultraviolet light, or by a beam of fast electrons; the radiation intensity is represented by $I_+$.

$\overline{P}$—primary illumination is stopped.

It may be assumed that during condition P as well as condition $\overline{P}$ the crystal is continually illuminated by additional scattered ambient light A.

The light channel through which light is propagated from the conditioning circuit 2 to the measured object 1 is symbolically designated 11. The sensing element 31 is in this case a photomultiplier. A second light channel for the luminescent radiation, for example in the visible range leads from the object 1 to the photo-multiplier 31 and is symbolically marked 12. The photo-multiplier 31 converts the measured luminescent light flux into electric current or electric voltage which is then further processed. By analogy to the first embodiment, the high-speed gate 3 and the photomultiplier 31 may comprise a single unit in which pulses from circuit 71 are supplied to some of the electrodes of the photomultiplier 31 in such a manner that full amplification of the primary photo-electric current emitted by the photocathode of the photomultiplier occurs only for tthe duration of the integration interval. The output current of the photomultiplier represents the luminous flux of crystal 1 only while the integration interval lasts. The interval controlling circuit 71 determines the duration of the integration interval so that the interval begins just at the moment when condition P finishes, and illumination therefore ends while condition $\overline{P}$ still lasts. No information concerning the intensity of the primary illumination therefore reaches the output of the photomultiplier 31.

Hence, under condition P there is in the output of the integrator 9 a quantity $Q_P$ which is proportional to the quantity of light emitted by the crystal when excited by primary illumination $I_+$, and a quantity $Q_A$ which is proportional to the quantity of light emitted by the crystal when excited by the additional illumination A.

Under condition $\overline{P}$ there is in the output of the integrator 9 only the quantity $Q_A$. If the generator 7 causes the conditioning device 2 to provide the condition P for a prescribed duration at the relatively high first frequency, while the generator 8 alternately switches P and $\overline{P}$ at the slower second frequency, the output component of the integrator 9 at the second frequency represents the quantity of light radiated by the crystal 1 after interruption of the primary radiation.

In a third example of the invention, the device 1 under test may be a sample of ferro-magnetic material, and the desired transient integral quantity is the residual flux of the sample after exceeding the Curie temperature. The blocks marked 7, 8, 71, 9, 4, 5, and 6 represent the same components represented by like numbered blocks in the preceding examples.

The conditioning circuit or block 2 varies the temperature of a measured sample 1 of a ferromagnetic material through the channel 11 between C above the Curie temperature and a value $C_-$ below the Curie temperature. The sample is assumed to be permanently maintained in an external magnetic field of a selected intensity H. The member 31 of FIG. 1 in this this case may be a turn of a conductor arranged around the measured sample with a selected crystallographic orientation. The induced voltage across the member 31 will be proportional to the time differential to the induction flux through the sample. The gate 3 is opened at the instant when the conditioning device 2 changes the sample temperature from $C_-$ to $C_+$ and the gate will remain in this condition while the temperature $C_+$ lasts. By analogy to the first example, the output components of the integrator 9 at the frequency of the timing generator 8 is proportional to the induction flux produced when the Curie temperature is exceeded.

Figure 2:
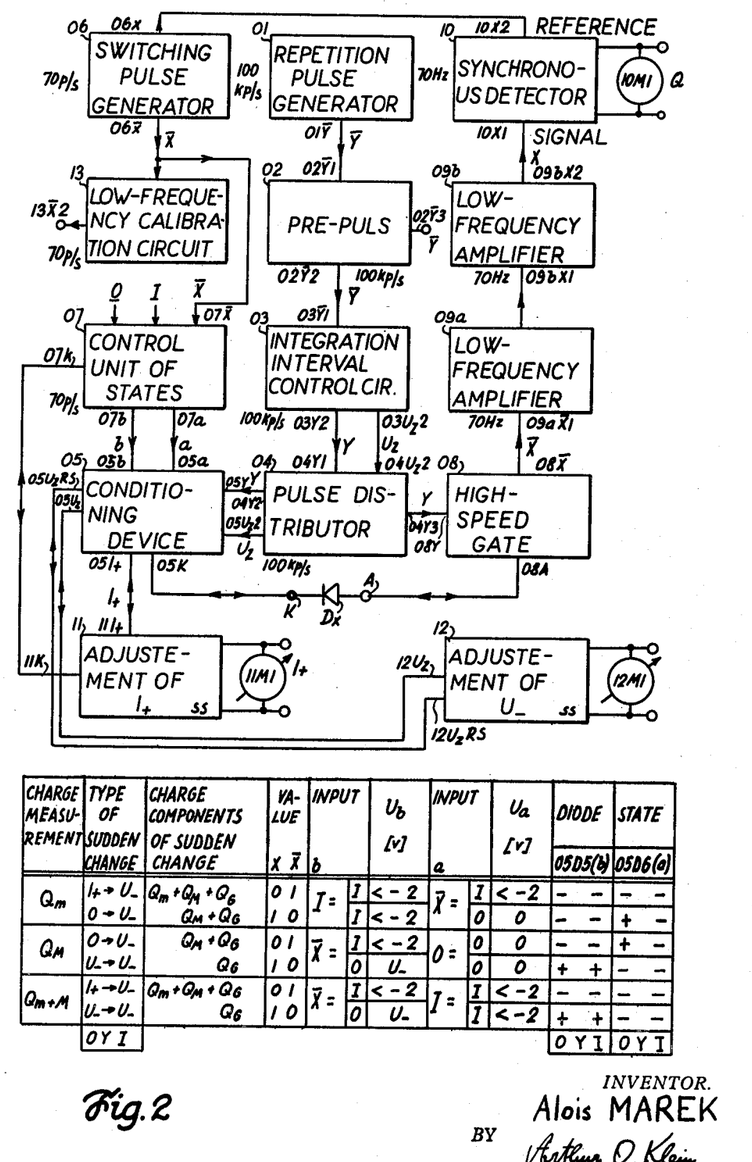
FIG. 2 is a more detailed block diagram with reference to the diagram in FIG. 1.

FIG. 2 shows a more detailed block diagram corresponding to the block diagram in FIG. 1 for measuring the reverse recovery process in semiconductor diodes. In the table in FIG. 2, Y represents repetition pulses from the generator 7 occurring at the first frequency, and X represents switching pulses from the generator 8 occurring at the second frequency.

The relationship between the various blocks in FIG. 1 and FIG. 2 can be seen from the following table.

TABLE SHOWING RELATIONSHIP BETWEEN FIGS. 1 AND 2

Figure 7:
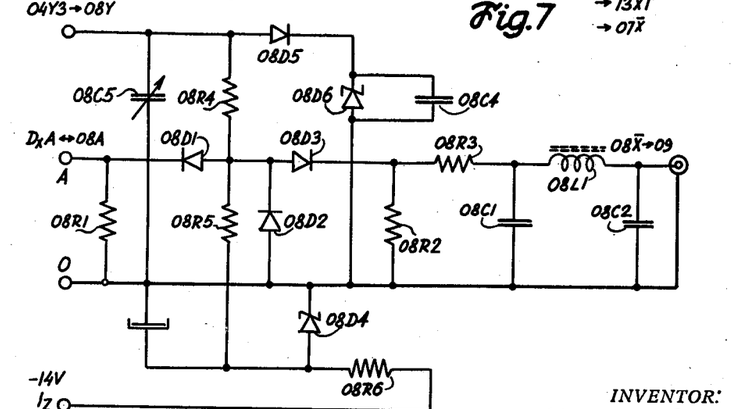
FIG. 7 illustrates a high speed gate to be used in the invention.

| FIG. 1: | FIG. 2 |
|---|---|
| Block 1 | Measured diode $D_x$. |
| Terminal 11 | Terminal K. |
| Terminal 12 | Terminal A. |
| Block 2 | Blocks 05, 07, 11, 12. |
| Block 3 | Part of block 08. |
| Element 31 | See resistor 08R1 in FIG. 7, transforming current into voltage. |
| Block 4 | Blocks 09a, 09b. |
| Block 5 | Block 10. |
| Block 6 | Output measuring instrument 10M1. |
| Block 7 | Block 01, 02, 03. |
| Block 71 | Part of block 04 affecting output 04Y3. |
| Block 8 | Block 06, block 13. |
| Block 9 | Integrator forming part of block 08. |

Block 01 in FIG. 2 represents a generator with a pulse output having a frequency of 100 kHz. derived from an LC circuit. These pulses may have a duty cycle of 1:2.

FIG. 3 shows the arrangement of block 02 in FIG. 2 in greater detail. The figure represents a delay network useful, e.g. for producing a prepulse for synchronizing an external oscilloscope used for adjusting the device in accordance with FIG. 2. The delay is obtained by saturation of transistor 02T1. The synchronization output 02$\overline{Y}$3 is derived from a sudden change in the voltage on the tunnel diode 02D1. The delayed output controlling the following circuits is on terminal 02$\overline{Y}$2.

The dotted lines in FIG. 3 indicate low inductance connections.

Block 03 in FIG. 2 produces from the delayed 100 kHz. pulses of the block 01 power pulses of duration slightly over 1µs. The input is on terminal 03$\overline{Y}$1, the output is on terminal 03Y2.

Block 04 in FIG. 2 produces from the power input 04Y1 two positive current pulses on the terminals 04Y2 and 04Y3 which are coincident in time, but are electrically independent. The leading edge of these pulses is in the range of nanoseconds and the maximum short-circuit current is 50 ma. The two outputs can supply such a large initial charge that the circuits connected thereto reach a steady state pulse voltage within a time of the order of nanoseconds. The pulse on the terminal 04Y2 terminates before the pulse on the terminal 04Y3.

Figure 4:
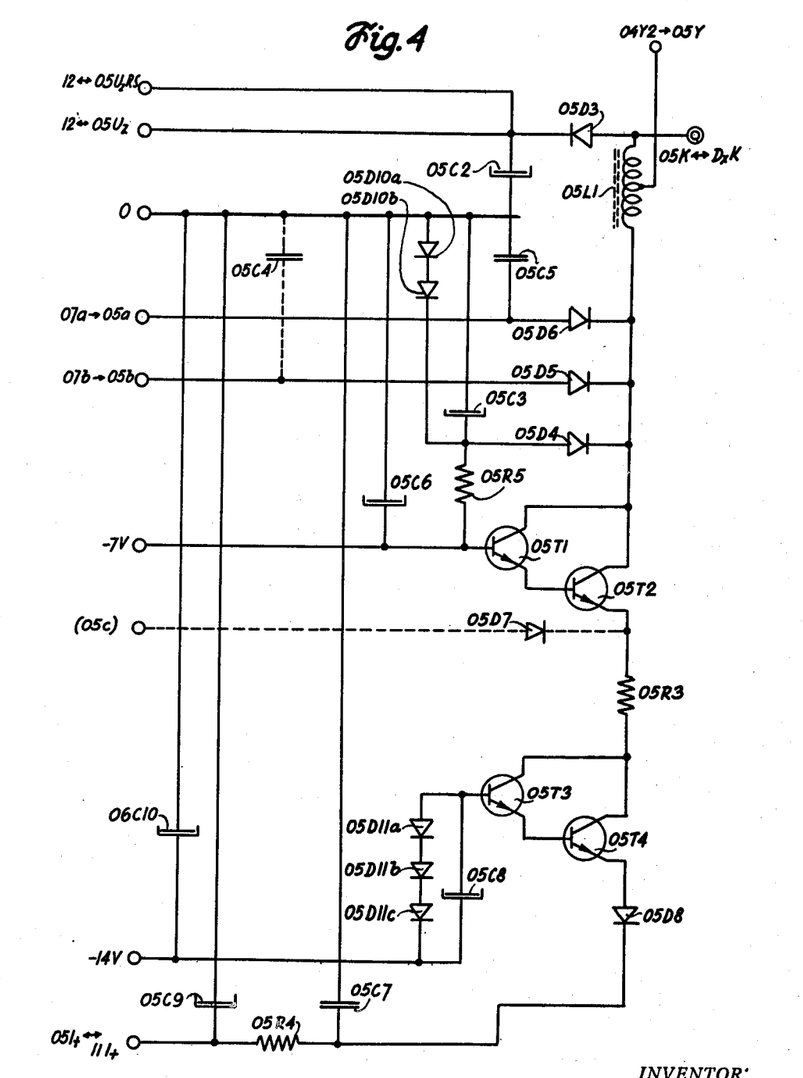
FIG. 4 illustrates a conditioning circuit for impressing measuring conditions on the device under test.

FIG. 4 shows block 05 in FIG. 2 in more detail. It represents a circuit for impressing measuring conditions viz. the forward current and back voltage, on the test diode whose cathode is connected to the output terminal 05K.

A cascade of four transistors 05T1, 05T2, 05T3 and 05T4 forms a source of constant current $I_+$ passing through the terminal 05$I_+$.

The diodes 05D5 and 05D6 provide a return path for this transistor current from the measuring diode through the terminals 05a and 05b.

The diode 05D3, which may be of the metal-semiconductor type determines the upper level of the cutoff voltage of the measured diode by means of the source of D-C voltage connected to the terminal 05$U_z$.

The ferrite autotransformer 05L1 adjusts the shape of the leading edge of the pulse on the cathode terminal 05K of the measured diode.

Figure 5:
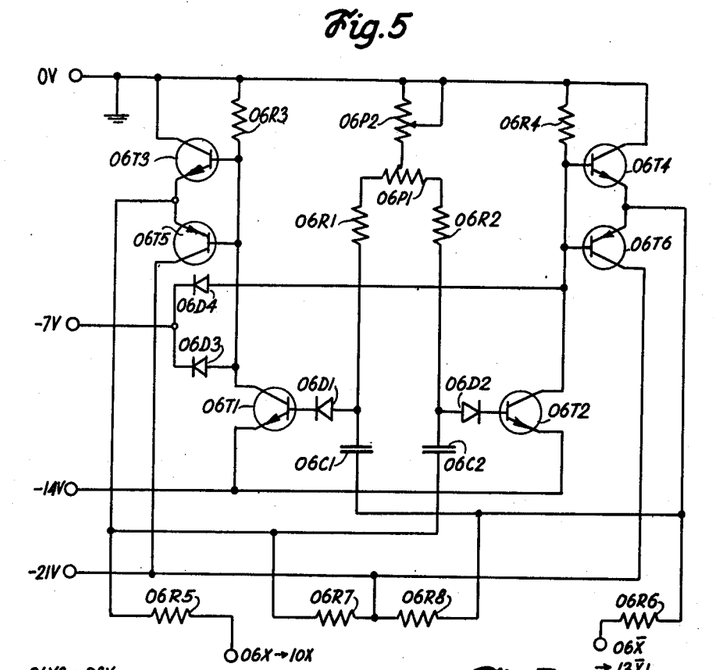
FIG. 5 shows a generator of low-frequency pulses.

FIG. 5 shows block 06 in FIG. 2 in more detail.

The figure shows a generator of low-frequency pulses of a frequency 70 Hz. Its two phases X and $\overline{X}$ are applied to terminals 06X and 06$\overline{X}$ respectively.

Figure 6:
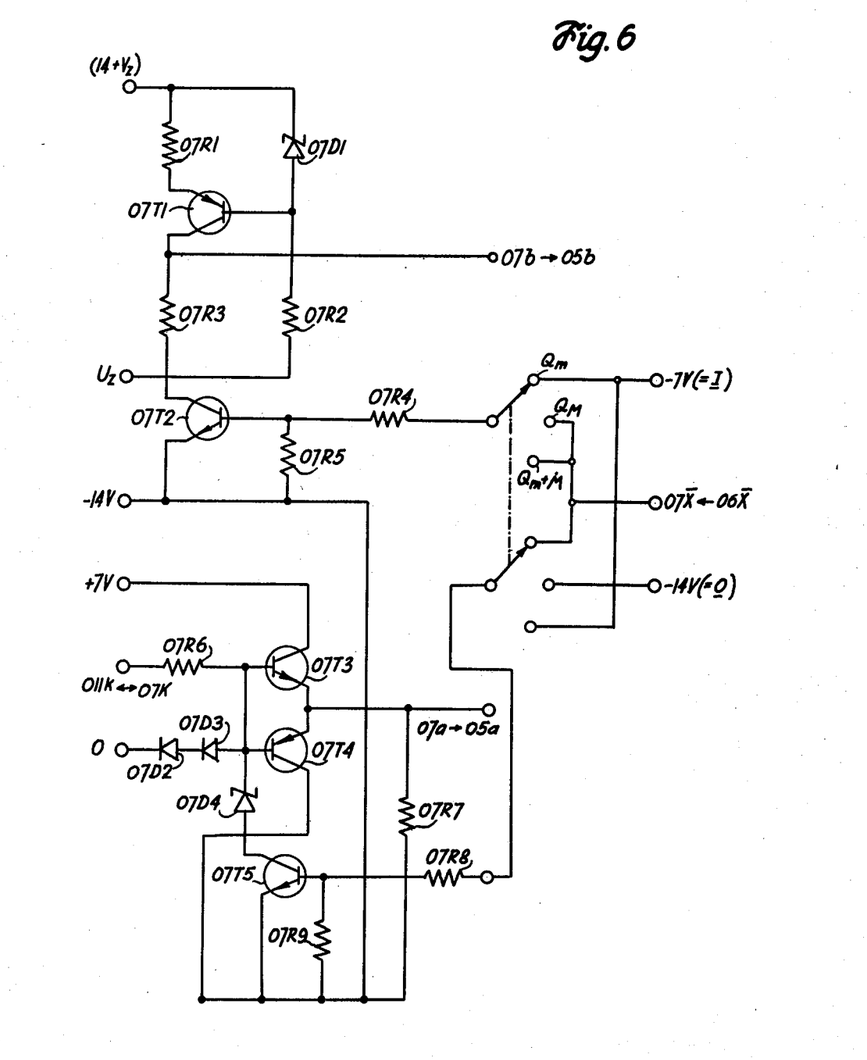
FIG. 6 shows a circuit for selecting the type of transient integral quantity to be measured.

FIG. 6 shows block 07 in FIG. 2 in more detail.

The figure shows a circuit for selecting the component of charge to be measured.

In the switch positions $Q_m$, $Q_N$, and $Q_m+Q_M$ selected voltages (either pulse voltages of a frequency 70 Hz. and a phase $\overline{X}$, or D-C voltages representing logic values 0 and 1), are coupled by means of the output terminal 07a, 07b to the diodes 05D6, 05D5 in block 05. Fine voltage corrections are derived in block 11 and coupled to the terminal 07$_k$.

FIG. 7 shows block 08 in FIG. 2 in more detail.

The figure shows a high-speed gate connected to the anode of the measured diode through the terminal 08A. The positive current pulse determining the duration of the integration interval is supplied to terminal 08Y. The diodes 08D1, 08D2, 08D3 which may be of the metal-semiconductor type form the gate proper. The diode 08D5 stabilizes the amplitude of the pulses which open the gate. The integrator suppressing the frequency 100 kHz. and higher is formed by a network comprising the resistor 08R3, the capacitor 08C1, the inductance 08L1 and the capacitor 08C2. The 70 Hz. integrator output component which is proportional to the measured charge appears at the output 08$\overline{X}$.

Figure 8:
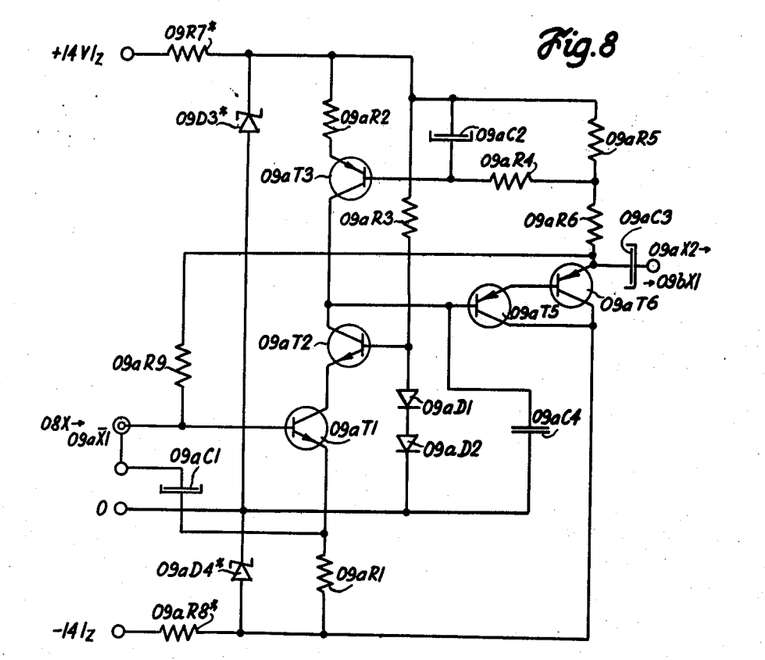
FIG. 8 is a low-frequency pre-amplifier.

FIG. 8 shows block 09a in FIG. 2 in more detail.

The figure shows a 70 Hz. pre-amplifier with a voltage gain of 2.000 (without feedback, approx. 26.000).

Figure 9:
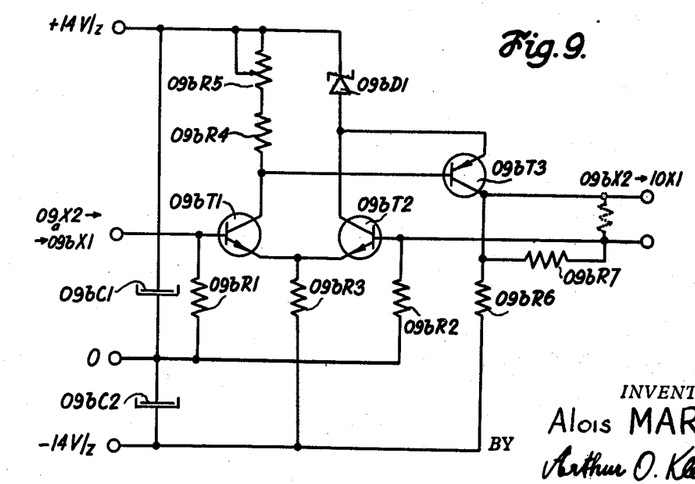
FIG. 9 is a low-frequency power amplifier.

FIG. 9 shows block 09b in FIG. 2 in more detail.

The figure shows a 70 Hz. power amplifier. The dotted resistor represents the adjustment of the low-frequency gain by means of resistor 096R7.

Figure 10:
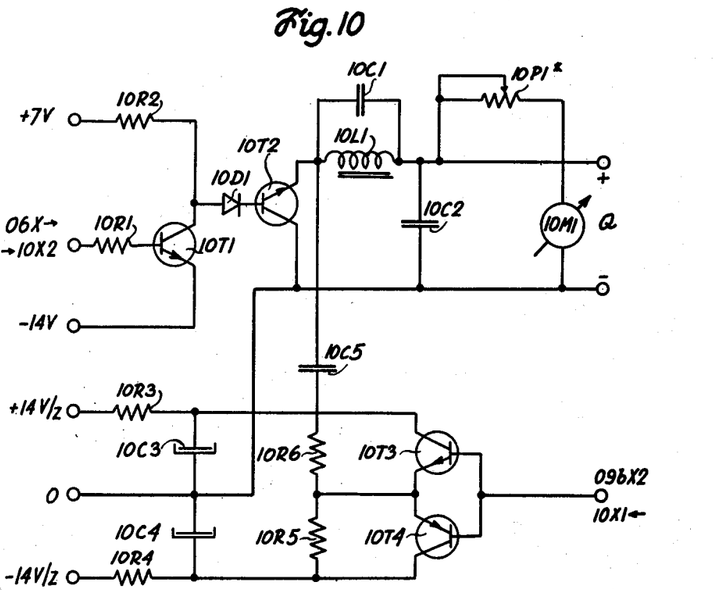
FIG. 10 illustrates a detector of the synchronous type to be used in the invention.

FIG. 10 shows block 10 in FIG. 2 in more detail.

The figure shows a synchronous detector. The intelligence input is applied to terminal 10X1 and the reference input is applied to 10X2. The choke 10L1 and the capacitor 10C1 form a tuned filter. The variable resistor 10P1 adjusts the total sensitivity of the device. The measuring instrument 10M1 indicates the measured charge.

Figure 11:
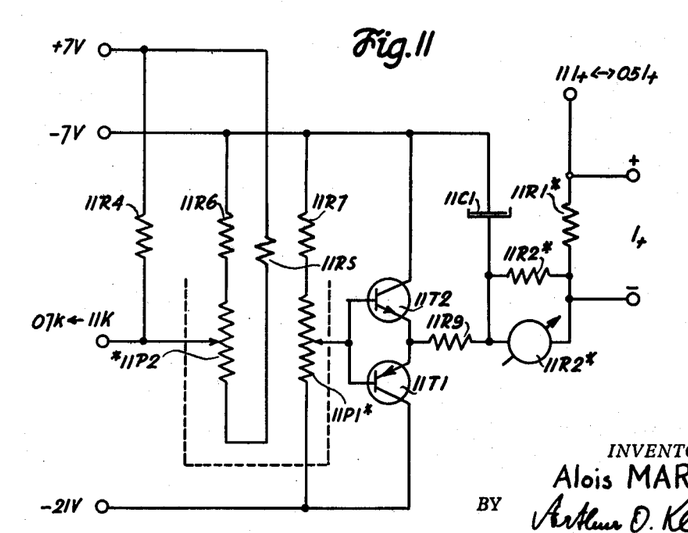
FIG. 11 illustrates a dual potentiometer.

FIG. 11 shows block 11 in FIG. 2 in more detail.

The figure shows a dual-potentiometer 11P1 and 11P2 which cooperates with circuits of block 05 to adjust the forward current $I_+$ of the measured diode. Part 11P2 compensates for small changes in U produced by current $I_+$ flowing through the circuits of block 05. The measuring instrument indicates the adjusted current $I_+$. Across resistor 11R1 there may be connected an external measuring instrument.

Figure 12:
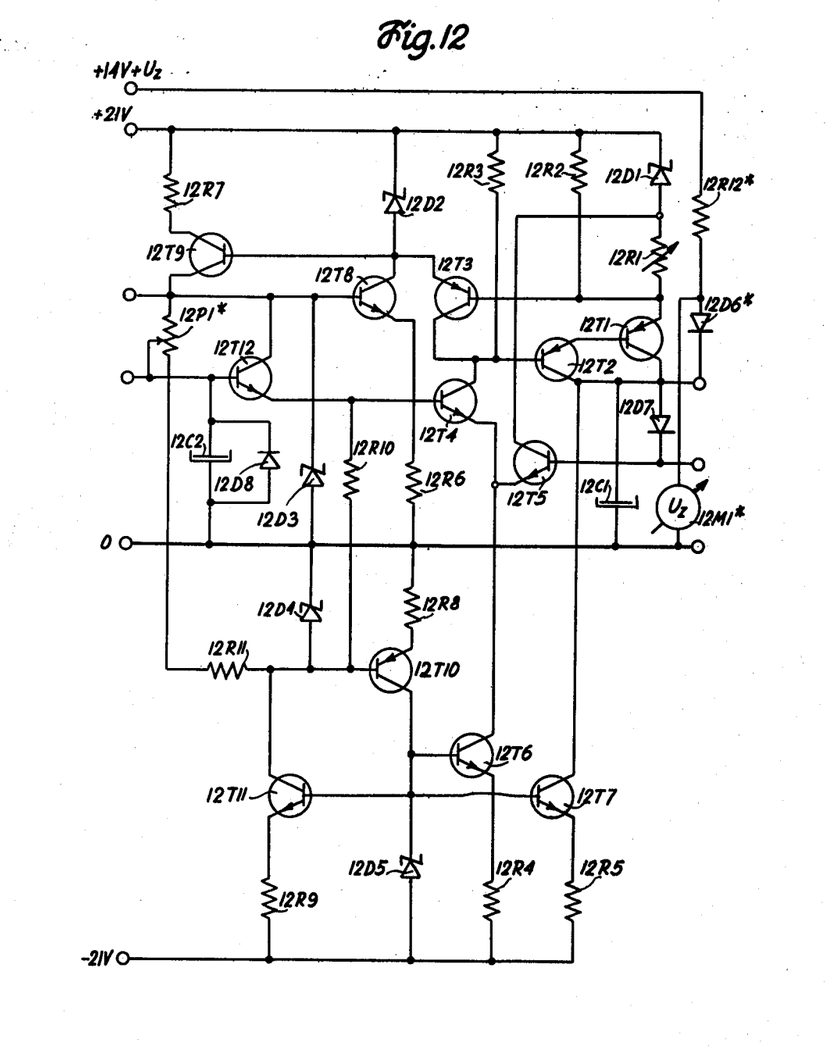
FIG. 12 shows a direct-current source.

FIG. 12 shows block 12 in FIG. 2.

The figure shows a D-C source for, adjusting, by means of potentiometer 12PI, the cutoff voltage $U_z$ of the measured diode. It employs two Allen circuits for supply voltage filtering and also for stabilization.

The two Allen circuits comprise the following elements:

first Allen circuit:—transistors 12T8 and 12T9, diodes 12D2, 12D3, resistors 12R6, 12R7,
second Allen circuit:—transistors 12T10, 12T11, diodes 12D4, 12D5, resistors 12R8, 12R9.

The voltage $U_z$ is measured by the instrument 12M1. The diode 12D6 compensates for the voltage change caused by the diode 05D3 in block 5 of FIG. 4.

FIG. 13 shows block 13 in FIG. 2 in more detail.

The figure shows a Zener diode 13D1 which stabilizes the 70 Hz. low-frequency pulse voltage in phase $\overline{X}$ for application to an external oscilloscope or the like.

What is claimed is:

1. Apparatus for deriving a quantity representative of the transient behavior of a repetitively switched test device, which comprises:
    a first pulse generator operating at a first frequency;
    a second pulse generator operating at a second frequency lower than the first frequency;
    conditioning means responsive to the outputs of the first and second pulse generators for alternately impressing two sets of selectable excitation conditions on the device at the relatively low second frequency and for repetitively switching the conditions of the then-impressed set at the relatively high first frequency so that the output of the device has components at the first and second frequencies;
    a normally closed gate coupled to the output of the device;
    means for repetitively opening the gate at the first frequency for a prescribed interval;
    an integrating circuit coupled to the output of the gate for substantially attenuating the signal component of the gate output at the first frequency and for transmitting the signal component of the gate output at the second frequency, said last-mentioned component being proportional to the desired quantity; and
    means coupled to the output of the integrating circuit for detecting the signal component at the second frequency.

2. Apparatus as claimed in claim 1, wherein the output of the detecting means is provided with a low-pass filter.

3. Apparatus as claimed in claim 1, comprising:
    a time base generator;
    a coordinate recording device having two inputs;
    means for coupling the time base generator to the conditioning means so that at least one condition is amplitude-modulated by the time base;
    means for coupling one input of the coordinate recording device to the conditioning means to drive one coordinate with the amplitude-modulated condition; and means for coupling the second input of the coordinate recording device to the output of the detecting means.

4. Apparatus as claimed in claim 3, wherein the output of the detecting means is provided with a low-pass filter.

References Cited

UNITED STATES PATENTS

| 3,348,145 | 10/1967 | Erath | 324—158 |
| 3,370,234 | 2/1968 | Wentworth | 324—158 |

OTHER REFERENCES

British Communications and Electronics, vol. 6, #11, November, 1959, pp. 788–791.

Electronics, Apr. 8, 1960, pp. 59–61.

RUDOLPH V. ROLINEC, Primary Examiner

E. L. STOLARUN, Assistant Examiner

U.S. Cl. X.R.

324—28, 34, 83